United States Patent
Vee et al.

(10) Patent No.: US 8,554,621 B2
(45) Date of Patent: Oct. 8, 2013

(54) IMPRESSION-TREND TECHNIQUES FOR PROVIDING A DISPLAY ADVERTISING SUPPLY FORECAST

(75) Inventors: Erik Vee, San Mateo, CA (US); Jayavel Shanmugasundaram, Santa Clara, CA (US); Long Ji Lin, San Jose, CA (US); Peiji Chen, Saratoga, CA (US); Datong Chen, Santa Clara, CA (US); Qi He, San Jose, CA (US)

(73) Assignee: Yahoo! Inc., Irvine, CA (US)

( * ) Notice: Subject to any disclaimer, the term of this patent is extended or adjusted under 35 U.S.C. 154(b) by 607 days.

(21) Appl. No.: 12/726,149

(22) Filed: Mar. 17, 2010

(65) Prior Publication Data

US 2011/0231248 A1 Sep. 22, 2011

(51) Int. Cl.
*G06Q 30/00* (2012.01)

(52) U.S. Cl.
USPC ........................................................ 705/14.45

(58) Field of Classification Search
None
See application file for complete search history.

(56) References Cited

U.S. PATENT DOCUMENTS

| | | | | |
|---|---|---|---|---|
| 2010/0114710 A1* | 5/2010 | Agarwal et al. | ............. | 705/14.66 |
| 2011/0112900 A1* | 5/2011 | Sanghavi | ................... | 705/14.43 |

* cited by examiner

*Primary Examiner* — Arthur Duran
*Assistant Examiner* — Christopher Busch
(74) *Attorney, Agent, or Firm* — Brinks Hofer Gilson & Lione

(57) ABSTRACT

Techniques are described herein for using an impression-trend technique to provide a display advertising supply forecast. A display advertising supply forecast is an estimate of a number of impressions, which are to occur in a future time period, that have specified attribute values. For example, the specified attribute values may be descriptive of impressions with respect to which an advertiser wishes to place ads. An impression-trend technique is a forecasting technique that uses trends regarding past impressions to forecast a number of future impressions that have specified attribute values. The past impressions include attribute values that are related to the specified attribute values.

20 Claims, 7 Drawing Sheets

IMPRESSION-TREND TECHNIQUES FOR PROVIDING A DISPLAY ADVERTISING SUPPLY FORECAST

BACKGROUND OF THE INVENTION

1. Field of the Invention

The present invention relates to display advertising.

2. Background

Certain display advertisement ("ad") networks enable display ads to be served to users who visit the Web sites of publishers that are participating in the display ad network. Advertisers generate the display ads and buy placements (a.k.a. inventory) for those ads on the publishers' Web sites usually based on the anticipated audiences for those sites. A placement represents a publisher's agreement to serve a trafficked (i.e., specified) ad to users when the users visit the publisher's site. The publisher often serves the trafficked ad contemporaneously with other content associated with the publisher's site.

Each time an ad is served to a user, an impression is said to occur. Each impression has attribute values that provide information regarding the user to whom the ad is served and/or the Web site with which the impression is associated. When an advertiser considers buying placements for an ad on a publisher's Web site, the advertiser often provides a query to the publisher, requesting a display advertising supply forecast. A display advertising supply forecast is an estimate of a number of impressions, which are to occur in a future time period, that have specified attribute values. The advertiser typically identifies the specified attribute values in the advertiser's query. For instance, the advertiser may want to target users that have certain attributes or Web sites or publishers that have certain attributes.

Theoretically, a publisher can generate a forecast for every possible combination of attribute values for which inventory is available to ensure that a forecast for impressions having attribute values that are specified by an advertiser is available to be provided to the advertiser. However, such a practice may be impractical for a variety of reasons. For example, the number of attributes and values thereof is often substantial. Accordingly, providing a forecast for every possible combination of attribute values may require extensive computations, which may consume substantial bandwidth and/or resources of the publisher. Moreover, the effect of an attribute on a forecast may be dependent on other attributes. For instance, a forecast for which individual effects of respective attributes are combined to provide the forecast may be substantially less accurate than a forecast for which the combination of attributes as a whole is taken into consideration. Furthermore, inventory for many combinations of attribute values may not be significant and/or stable enough to provide a predictable pattern.

BRIEF SUMMARY OF THE INVENTION

Various approaches are described herein for, among other things, using an impression-trend technique to provide a display advertising supply forecast. A display advertising supply forecast is an estimate of a number of impressions, which are to occur in a future time period, that have specified attribute values. For example, the specified attribute values may be descriptive of impressions with respect to which an advertiser wishes to place ads. An impression-trend technique uses trends regarding past impressions to forecast a number of future impressions that have specified attribute values. The past impressions have attribute values that are related to the specified attribute values. An attribute value is said to be related to another attribute value if the first attribute value is the same as the second attribute value, encompasses the second attribute value, or is encompassed by the second attribute value.

An example method of linking impressions to trends is described. In accordance with this example method, impressions in each of a plurality of first subsets of impressions are aggregated to provide a first periodically aggregated time series. The plurality of first subsets corresponds to a plurality of respective time periods. Each of the impressions in the first subsets has a first combination of attribute values that is related to a designated combination of attribute values. Impressions in each of a plurality of second subsets of impressions are aggregated to provide a second periodically aggregated time series. The plurality of second subsets corresponds to the plurality of respective time periods. Each of the impressions in the second subsets has a second combination of attribute values that is related to the designated combination of attribute values. A first number of impressions in each of the first subsets that correspond to a first portion of the time periods are estimated using a first trend to provide respective first forecasts. The first trend is based on the first subsets that correspond to a second portion of the time periods. A second number of impressions in each of the second subsets that correspond to the first portion of the time periods are estimated using a second trend to provide respective second forecasts. The second trend is based on the second subsets that correspond to the second portion of the time periods. The first numbers and the first forecasts are compared to determine a first cumulative error value. The second numbers and the second forecasts are compared to determine a second cumulative error value. For each impression that occurs in a specified period of time, the impression is linked to a third trend that is based on the first subsets that correspond to the first portion of the time periods and the first subsets that correspond to the second portion of the time periods if the impression is included among the first subsets and among the second subsets and the first cumulative error value is less than the second cumulative error value. For each impression that occurs in the specified period of time, the impression is linked to a fourth trend that is based on the second subsets that correspond to the first portion of the time periods and the second subsets that correspond to the second portion of the time periods if the impression is included among the first subsets and among the second subsets and the first cumulative error value is greater than the second cumulative error value. For each impression that occurs in the specified period of time, the impression is linked to the third trend if the impression is included among the first subsets and not among the second subsets. For each impression that occurs in the specified period of time, the impression is linked to the fourth trend if the impression is included among the second subsets and not among the first subsets.

An example method of providing a display advertising supply forecast is described. In accordance with this example method, a query to estimate a number of first impressions, which are to occur in a future time period, that have a combination of specified attribute values is received. The combination includes a first subset of the specified attribute values and a second subset of the specified attribute values. An interim trend and a number of second impressions that are linked to the interim trend are combined to provide a revised trend. The second impressions occur in a past time period and have the first subset of the specified attribute values and the second subset of the specified attribute values. The interim trend is based on a plurality of aggregates of impressions that have a third combination of attribute values. The third combination of attribute values is related to the second subset of the specified attribute values. The plurality of aggregates corresponds to a plurality of respective time periods. The number of the first impressions that have the combination of specified attribute values is estimated based on the revised trend to provide the display advertising supply forecast.

An example system to link impressions to trends is described that includes an aggregation module, a forecast module, a comparison module, and a linking module. The aggregation module is configured to aggregate impressions in each of a plurality of first subsets of impressions that corresponds to a plurality of respective time periods to provide a first periodically aggregated time series. Each of the impressions in the first subsets has a first combination of attribute values that is related to a designated combination of attribute values. The aggregation module is further configured to aggregate impressions in each of a plurality of second subsets of impressions that corresponds to the plurality of respective time periods to provide a second periodically aggregated time series. Each of the impressions in the second subsets has a second combination of attribute values that is related to the designated combination of attribute values. The forecast module is configured to estimate a first number of impressions in each of the first subsets that correspond to a first portion of the time periods using a first trend to provide respective first forecasts. The first trend is based on the first subsets that correspond to a second portion of the time periods. The forecast module is further configured to estimate a second number of impressions in each of the second subsets that correspond to the first portion of the time periods using a second trend to provide respective second forecasts. The second trend is based on the second subsets that correspond to the second portion of the time periods. The comparison module is configured to compare the first numbers and the first forecasts to determine a first cumulative error value. The comparison module is further configured to compare the second numbers and the second forecasts to determine a second cumulative error value. The linking module is configured to link each impression that occurs in a specified period of time and that is included among the first subsets and among the second subsets to a third trend if the first cumulative error value is less than the second cumulative error value. The third trend is based on the first subsets that correspond to the first portion of the time periods and the first subsets that correspond to the second portion of the time periods. The linking module is further configured to link each impression that occurs in the specified period of time and that is included among the first subsets and among the second subsets to a fourth trend if the first cumulative error value is greater than the second cumulative error value. The fourth trend is based on the second subsets that correspond to the first portion of the time periods and the second subsets that correspond to the second portion of the time periods. The linking module is further configured to link each impression that occurs in the specified period of time and that is included among the first subsets and not among the second subsets to the third trend. The linking module is further configured to link each impression that occurs in the specified period of time and that is included among the second subsets and not among the first subsets to the fourth trend.

An example system to provide a display advertising supply forecast is described that includes a query module, a combination module, and a forecast module. The query module is configured to receive a query to estimate a number of first impressions, which are to occur in a future time period, that have a combination of specified attribute values. The combination includes a first subset of the specified attribute values and a second subset of the specified attribute values. The combination module is configured to combine an interim trend and a number of second impressions that are linked to the interim trend to provide a revised trend. The second impressions occur in a past time period and have the first subset of the specified attribute values and the second subset of the specified attribute values. The interim trend is based on a plurality of aggregates of impressions that have a third combination of attribute values. The third combination of attribute values is related to the second subset of the specified attribute values. The plurality of aggregates corresponds to a plurality of respective time periods. The forecast module is configured to estimate the number of the first impressions that have the combination of specified attribute values based on the revised trend to provide the display advertising supply forecast.

An example computer program product is described that includes a computer-readable medium having computer program logic recorded thereon for enabling a processor-based system to link impressions to trends. The computer program logic includes first, second, third, fourth, fifth, sixth, seventh, eighth, ninth, and tenth program logic modules. The first program logic module is for enabling the processor-based system to aggregate impressions in each of a plurality of first subsets of impressions that corresponds to a plurality of respective time periods to provide a first periodically aggregated time series. Each of the impressions in the first subsets has a first combination of attribute values that is related to a designated combination of attribute values. The second program logic module is for enabling the processor-based system to aggregate impressions in each of a plurality of second subsets of impressions that corresponds to the plurality of respective time periods to provide a second periodically aggregated time series. Each of the impressions in the second subsets has a second combination of attribute values that is related to the designated combination of attribute values. The third program logic module is for enabling the processor-based system to estimate a first number of impressions in each of the first subsets that correspond to a first portion of the time periods using a first trend to provide respective first forecasts. The first trend is based on the first subsets that correspond to a second portion of the time periods. The fourth program logic module is for enabling the processor-based system to estimate a second number of impressions in each of the second subsets that correspond to the first portion of the time periods using a second trend to provide respective second forecasts. The second trend is based on the second subsets that correspond to the second portion of the time periods. The fifth program logic module is for enabling the processor-based system to compare the first numbers and the first forecasts to determine a first cumulative error value. The sixth program logic module is for enabling the processor-based system to compare the second numbers and the second forecasts to determine a second cumulative error value. The seventh program logic module is for enabling the processor-based system to link each impression that occurs in a specified period of time and that is included among the first subsets and among the second subsets to a third trend if the first cumulative error value is less than the second cumulative error value. The third trend is based on the first subsets that correspond to the first portion of the time periods and the first subsets that correspond to the second portion of the time periods. The eighth program logic module is for enabling the processor-based system to link each impression that occurs in the specified period of time and that is included among the first subsets and among the second subsets to a fourth trend if the first cumulative error value is greater than the second cumulative error value. The fourth trend is based on the second subsets that correspond to the first portion of the time periods and the second subsets that correspond to the second portion of the time periods. The ninth program logic module is for enabling the processor-based system to link each impression that occurs in the specified period of time and that is included among the first subsets and not among the second subsets to the third trend. The tenth program logic module is for enabling the processor-based system to link each impression that occurs in the specified period of time and that is included among the second subsets and not among the first subsets to the fourth trend.

An example computer program product is described that includes a computer-readable medium having computer program logic recorded thereon for enabling a processor-based system to provide a display advertising supply forecast. The computer program logic includes first, second, and third program logic modules. The first program logic module is for enabling the processor-based system to interpret a query to estimate a number of first impressions, which are to occur in a future time period, that have a combination of specified attribute values. The combination includes a first subset of the specified attribute values and a second subset of the specified attribute values. The second program logic module is for enabling the processor-based system to combine an interim trend and a number of second impressions that are linked to the interim trend to provide a revised trend. The second impressions occur in a past time period and have the first subset of the specified attribute values and the second subset of the specified attribute values. The interim trend is based on a plurality of aggregates of impressions that have a third combination of attribute values. The third combination of attribute values is related to the second subset of the specified attribute values. The plurality of aggregates corresponds to a plurality of respective time periods. The third program logic module is for enabling the processor-based system to estimate the number of the first impressions that have the combination of specified attribute values based on the revised trend to provide the display advertising supply forecast.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
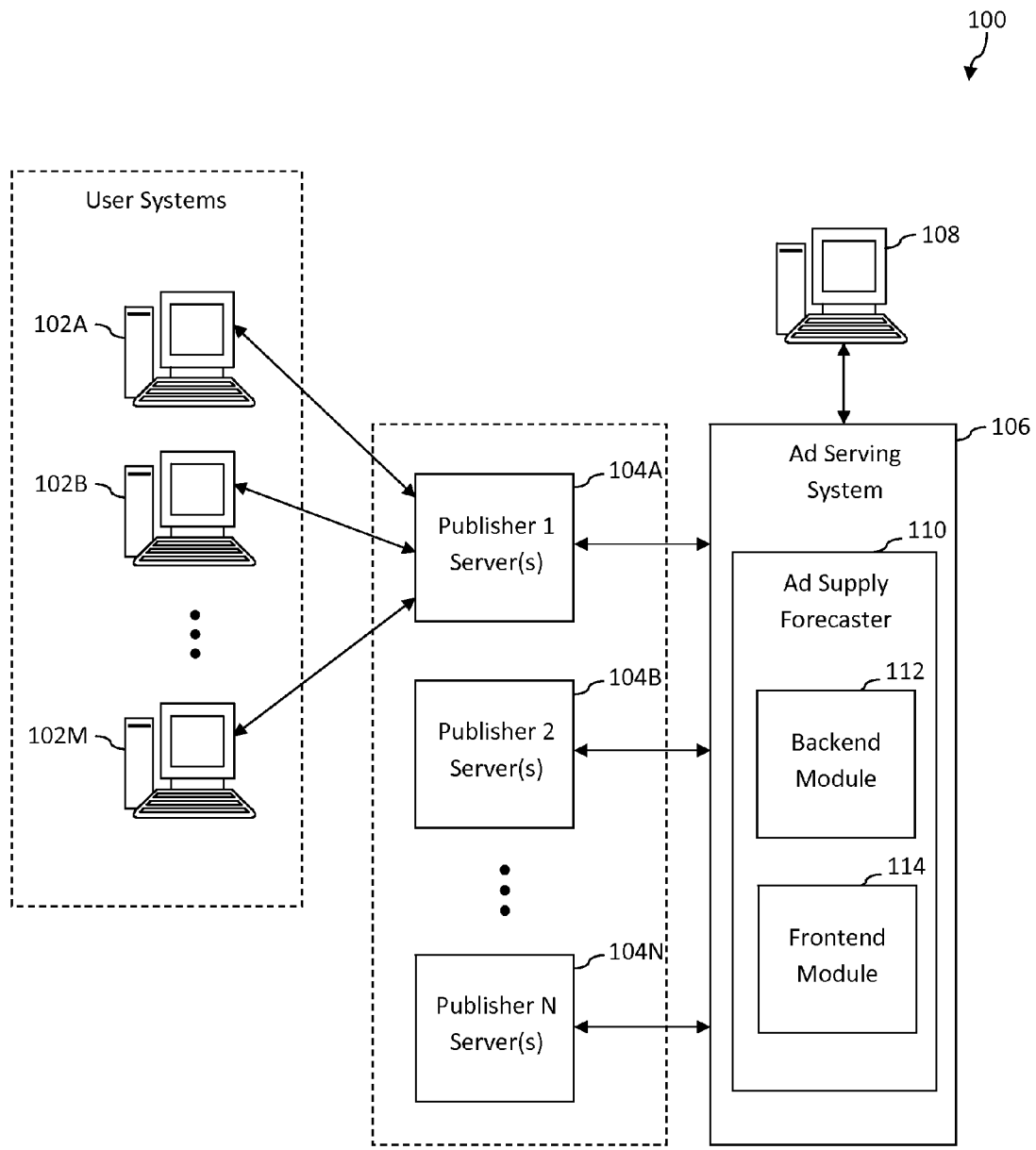
FIG. 1 is a block diagram of an example display advertisement ("ad") network in accordance with an embodiment described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are capable of using an impression-trend technique to provide a display advertising supply forecast. A display advertising supply forecast is an estimate of a number of impressions, which are to occur in a future time period, that have specified attribute values. For example, the specified attribute values may be descriptive of impressions with respect to which an advertiser wishes to place ads. An impression-trend technique uses trends regarding past impressions to forecast a number of future impressions that have specified attribute values. The past impressions have attribute values that are related to the specified attribute values.

An attribute value is said to be related to another attribute value if the first attribute value is the same as the second attribute value, encompasses the second attribute value, or is encompassed by the second attribute value. For example, a first attribute value may indicate a first Web site, and a second attribute value may indicate a second Web site that includes the first Web site. In accordance with this example, the first attribute value is said to be encompassed by the second attribute value. Accordingly, the first attribute value is said to be related to the second attribute value.

Techniques described herein have a variety of benefits as compared to conventional techniques for providing a display advertising supply forecast. For example, by retaining original impressions in forecast data, an accurate representation of a publisher's inventory may be provided. The techniques described herein may be sufficiently flexible and extensible to automatically support different and/or new attributes and/or values thereof. Accuracy and/or stability of a forecast may be improved by aggregating counts of combinations of attribute values. Techniques described herein may consume substantially less bandwidth and/or resources of a publisher than conventional techniques. Finally, techniques described herein are capable of providing accurate forecasts of advertising inventory with an arbitrary combination of attribute values at a relatively low cost.

II. Example Embodiments for Providing a Display Advertising Supply Forecast

FIG. 1 is a block diagram of an example display advertisement ("ad") network in accordance with an embodiment of the present invention. Generally speaking, display ad network 100 operates to serve display ads provided by advertisers to sites (e.g., Web sites) published by publishers when such sites are accessed by certain users of the network, thereby delivering the display ads to the users. As shown in FIG. 1, display ad network 100 includes a plurality of user systems 102A-102M, a plurality of publisher servers 104A-104N, an ad serving system 106, and at least one advertiser system 108. Communication among user systems 102A-102M, publisher servers 104A-104N, ad serving system 106, and advertiser system 108 is carried out over a network using well-known network communication protocols. The network may be a wide-area network (e.g., the Internet), a local area network (LAN), another type of network, or a combination thereof.

User systems 102A-102M are computers or other processing systems, each including one or more processors, that are capable of communicating with any one or more of publisher servers 104A-104N. For example, each of user systems 102A-102M may include a client that enables a user who owns (or otherwise has access to) the user system to access sites (e.g., Web sites) that are hosted by publisher servers 104A-104N. For instance, a client may be a Web crawler, a Web browser, a non-Web-enabled client, or any other suitable type of client. By way of example, each of user systems 102A-102M is shown in FIG. 1 to be communicatively coupled to publisher 1 server(s) 104A for the purpose of accessing a site published by publisher 1. Persons skilled in the relevant art(s) will recognize that each of user systems 102A-102M is capable of connecting to any of publisher servers 104A-104N for accessing the sites hosted thereon.

Publisher servers 104A-104N are computers or other processing systems, each including one or more processors, that are capable of communicating with user systems 102A-102M. Each of publisher servers 104A-104N is configured to host a site (e.g., a Web site) published by a corresponding publisher 1-N so that such site is accessible to users of network 100 via user systems 102A-102M. Each of publisher servers 104A-104N is further configured to serve display ad(s) to users of network 100 when those users access a Web site that is hosted by the respective publisher server.

Ad serving system 106 is a computer or other processing system, including one or more processors, that is capable of serving display ads that are received from advertiser system 108 to each of publisher servers 104A-104N when the sites hosted by such servers are accessed by certain users, thereby facilitating the delivery of such display ads to the users. Ad serving system 106 includes an ad supply forecaster 110. Ad supply forecaster 110 is configured to provide a display advertising supply forecast regarding a publisher's site in response to a query that specifies designated attribute values. A display advertising supply forecast is an estimate of a number of impressions, which are to occur with respect to a Web site in a future time period, that have specified attribute values. For example, the specified attribute values may be descriptive of impressions with respect to which an advertiser wishes to place ads. In accordance with this example, ad supply forecaster 110 may receive the query that identifies the specified attribute values from the advertiser via advertiser system 108.

Ad supply forecaster 110 uses an impression-trend technique to provide the display advertising supply forecast. An impression-trend technique is a technique that uses trends regarding past impressions to forecast a number of future impressions that have specified attribute values. A trend is an inventory forecast for specified aggregates of impressions. For example, a relatively more extensive aggregation may correspond to a relatively more predictable pattern. In accordance with this example, outliers may affect the pattern less if the impressions are more extensively aggregated. The past impressions have attribute values that are related to the specified attribute values. The attribute values of the past impressions may be obtained from a client side counting (CSC) log, users' identifiers (e.g., usernames), users' browser cookies, etc., or a combination thereof.

Ad supply forecaster 110 includes backend module 112 and frontend module 114. In accordance with example embodiments, backend module 112 is configured to perform backend (i.e., non-real-time) processing operations. One example backend operation that is performed by backend module 112 is linking impressions to trends. The trends that are discussed herein are based on respective periodically aggregated time series. A time series is a sequence of data points that represent successive time periods. For instance, the durations of the successive time periods may be uniform, though it will be recognized that the durations may be non-uniform. A periodically aggregated time series is a time series in which each data point represents an aggregate of data that pertains to the time period that corresponds to that data point. Accordingly, each periodically aggregated time series that is discussed herein includes aggregates of impressions that pertain to respective time periods.

In accordance with some example embodiments, backend module 112 initially generates preliminary trends that are based on a first portion of the time periods. Each preliminary trend is further based on respective aggregates of impressions that have a respective combination of attribute values that are related to a designated combination of attribute values. Backend module 112 tests each preliminary trend against respective aggregates of impressions that have the respective combination of attribute values in a second portion of the time periods to determine an accuracy of that trend. Upon determining the accuracies of the preliminary trends, backend module 112 generates respective updated trends that are based on both the first portion and the second portion of the time periods. The accuracies of the preliminary trends are deemed to be applicable to the respective updated trends.

Backend module 112 links impressions that occur in a specified time period among the updated trends based on relevance and/or accuracy of the trends. Relevance depends on how closely the combination of attribute values that is associated with a trend matches the designated combination of attribute values; whereas, accuracy is determined in accordance with a technique such as the one described in the previous paragraph. Backend module 112 may store information regarding links between the impressions and the trends, so that such information may be accessed upon receipt of a query for a display advertising supply forecast. Techniques for linking impressions to trends are described in further detail below in second II.A. with reference to FIGS. 2A, 2B, and 3.

In accordance with example embodiments, frontend module 114 is configured to perform frontend (i.e., real-time) processing operations. One example frontend operation that is performed by frontend module 114 is providing a display advertising supply forecast in response to a query therefor. For example, frontend module 114 may receive the query from an advertiser who wishes to place ads with respect to a site of a publisher. The query for the display advertising supply forecast requests an estimate of a number of impressions that are to occur in a future time period and that have specified attribute values (e.g., the uniform reference locator (URL) of the site of the publisher, user gender, user age range, user location, user Internet Protocol (IP) address, etc.). Upon receiving such a query, frontend module 114 determines how many of the impressions that occur in a specified period of time (e.g., the last week or month) and that include the specified attribute values are linked to each trend. For instance, frontend module 114 may select the specified period of time to represent the most recent composition of traffic.

Frontend module 114 combines the trends and the respective numbers of impressions for the trends to provide respective revised trends. Frontend module 114 provides the advertising supply forecast based on the revised trends. Techniques for providing a display advertising supply forecast are described in further detail below in second II.B. with reference to FIGS. 4 and 5.

Advertiser system 108 is a computer or other processing system, including one or more processors, that is capable of providing a query to ad serving system 106, requesting a display advertising supply forecast regarding a publisher's site. For instance, an advertiser may submit the query using a client installed on advertiser system 108, which is owned or otherwise accessible to the advertiser. Advertiser system 108 may be configured to provide display ads to ad serving system 106, so that the display ads may be served to publisher servers 104A-104N when the sites hosted by the respective servers are accessed by certain users.

Although one advertiser 102 system is depicted in FIG. 1, persons skilled in the relevant art(s) will recognize that any number of advertiser systems may be communicatively coupled to ad serving system 106. For instance, the functionality of ad supply forecaster 106 may be accessible to one or more advertisers or representatives thereof via respective advertiser systems.

Although advertiser system 108 and user systems 102A-102M are depicted as desktop computers in FIG. 1, persons skilled in the relevant art(s) will appreciate that advertiser system 108 and user systems 102A-102M may include any browser-enabled system or device, including but not limited to a laptop computer, a personal digital assistant, a cellular telephone, or the like.

A. Example Backend Processing Embodiments

Figure 2A:
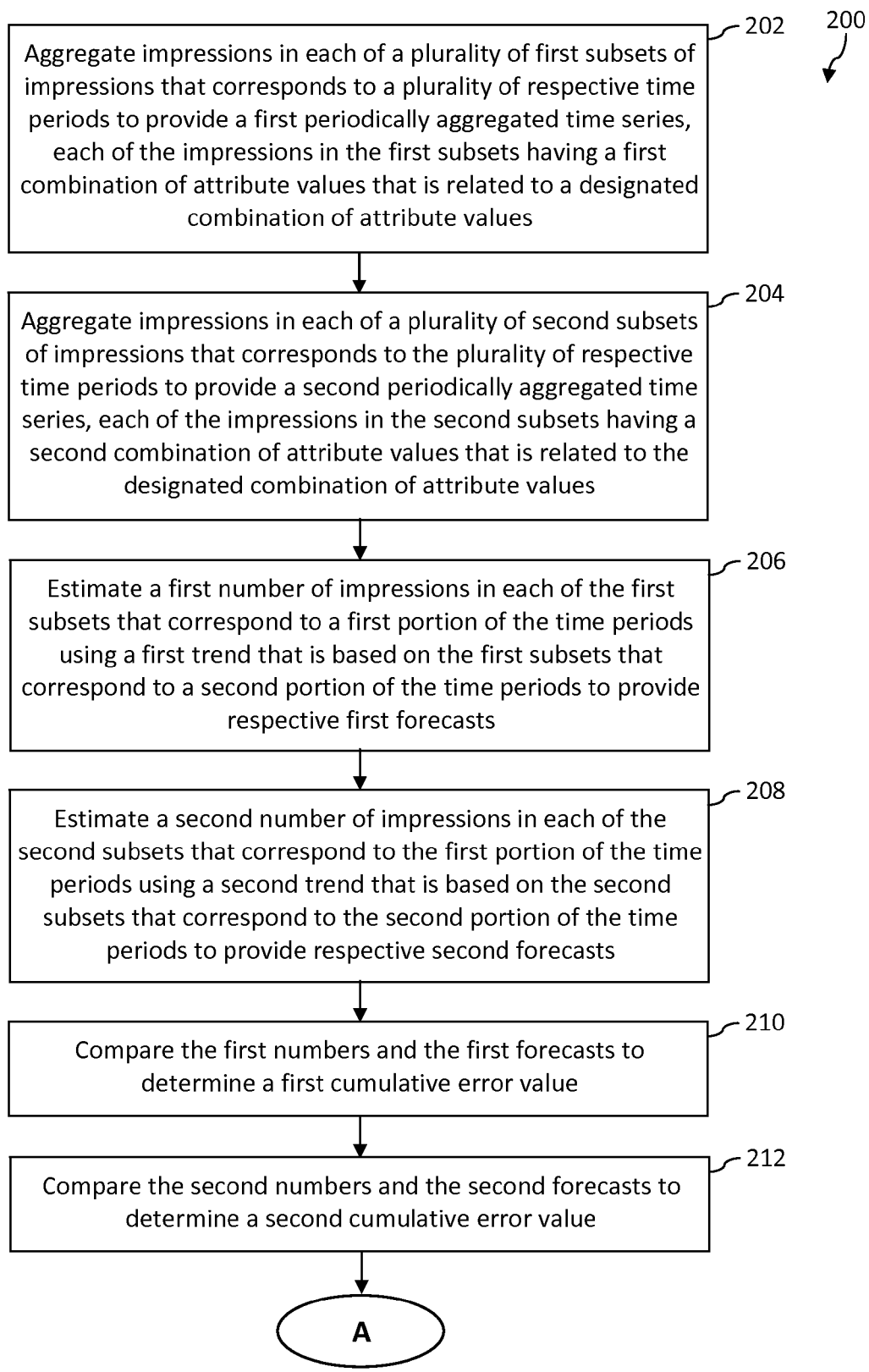
FIGS. 2A and 2B depict respective portions of a flowchart of an example method for linking impressions to trends in accordance with an embodiment described herein.
Figure 2B:
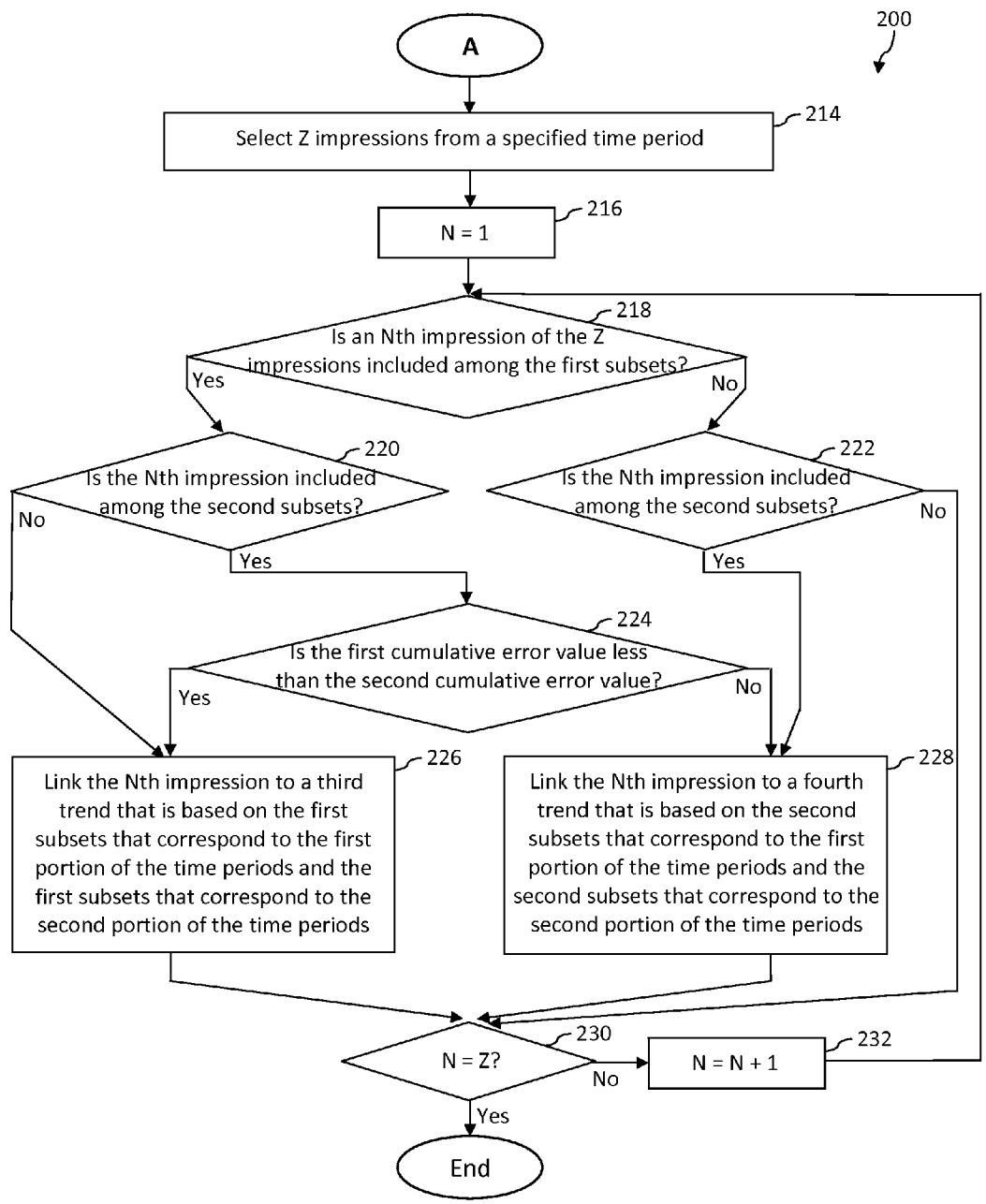
Figure 3:
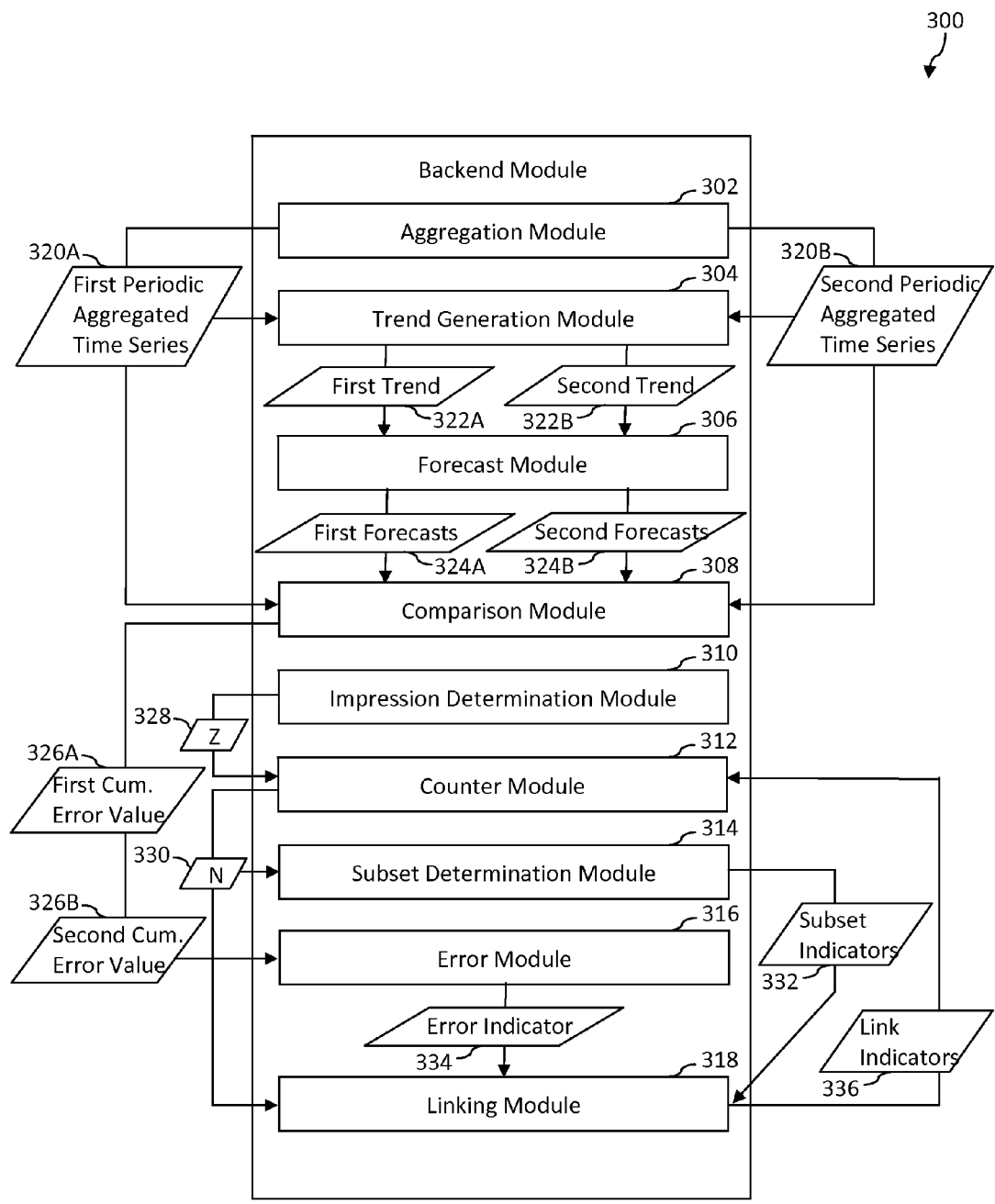
FIG. 3 is a block diagram of an example implementation of a backend module shown in FIG. 1 in accordance with an embodiment described herein.

FIGS. 2A and 2B depict respective portions of a flowchart 200 of an example method for linking impressions to trends in accordance with an embodiment described herein. Flowchart 200 may be performed by backend module 112 of display ad network 100 shown in FIG. 1, for example. For illustrative purposes, flowchart 200 is described with respect to a backend module 300 shown in FIG. 3, which is an example of a backend module 112, according to an embodiment. As shown in FIG. 3, backend module 300 includes an aggregation module 302, a trend generation module 304, a forecast module 306, a comparison module 308, an impression determination module 310, a counter module 312, a subset determination module 314, an error module 316, and a linking module 318. Further structural and operational embodiments will be apparent to persons skilled in the relevant art(s) based on the discussion regarding flowchart 200. Flowchart 200 is described as follows.

As shown in FIG. 2A, the method of flowchart 200 begins at step 202. In step 202, impressions in each of a plurality of first subsets of impressions are aggregated to provide a first periodically aggregated time series. The plurality of first subsets of impressions corresponds to a plurality of respective time periods. Each of the impressions in the first subsets has a first combination of attribute values that is related to a designated combination of attribute values. For example, a client side counting (CSC) log may be used to determine the impressions in the first subsets. In accordance with this example, it may be said that the impressions in each of the plurality of first subsets of impressions are aggregated using the CSC. The time periods may have any suitable duration, such as an hour, a day, a week, a month, etc., or any multiple thereof. In an example implementation, aggregation module 302 aggregates the impressions in each of the plurality of first subsets of impressions to provide first periodically aggregated time series 320A. For instance, aggregation module 302 may concatenate the plurality of first subsets to provide first periodically aggregated time series 320A.

At step 204, impressions in each of a plurality of second subsets of impressions are aggregated to provide a second periodically aggregated time series. The plurality of second subsets of impressions corresponds to the plurality of respective time periods. Each of the impressions in the second subsets has a second combination of attribute values that is related to the designated combination of attribute values. For example, a CSC log may be used to determine the impressions in the second subsets. In accordance with this example, it may be said that the impressions in each of the plurality of second subsets of impressions are aggregated using the CSC. In an example implementation, aggregation module 302 aggregates the impressions in each of the plurality of second subsets of impressions to provide second periodically aggregated time series 320B. For instance, aggregation module 302 may concatenate the plurality of second subsets to provide second periodically aggregated time series 320B.

In an example embodiment, the designated combination of attribute values specifies a designated Web site. In accordance with this example embodiment, the first combination of attribute values specifies the designated Web site, and the second combination of attribute values specifies a second Web site that includes the designated Web site.

In an example embodiment, the designated combination of attribute values specifies a designated Web site and at least one of a designated user device type, a designated ad delivery mode, or a designated ad behavior. A user device type is a device type with which a user or a group of users may be associated. The user device type refers to the browser or other delivery medium. Examples of a user device type include but are not limited to a mobile device, an email client, Internet Explorer, Firefox, etc.

An ad delivery mode indicates how and/or where an ad is to be displayed to a user. Examples of an ad delivery mode include but are not limited to "above the fold", "below the fold", "span the fold", "pop up", "pop under", etc. "Above the fold" means that the user sees the ad before scrolling down a Web page with respect to which the ad is served. "Below the fold" means that the user does not see the ad until the user scrolls down the page. "Span the fold" means that the top edge of the ad is at least a threshold proportion (e.g., 10%, 30%, 52%, etc.) above the fold. A pop up ad is an ad that loads in a new window that opens in front of a current window. A pop under ad is an ad that loads in a new window that opens behind a current window.

An ad behavior indicates a manner in which an ad behaves upon being served to a user. Examples of ad behavior include but are not limited to audio, video, floating, expandable, clickable, etc. A floating ad is an ad that moves across a user's screen or floats above content on a Web page with respect to which the ad is served. An expandable ad is an ad that changes size and may alter the content of the Web page.

In accordance with this example embodiment, the first combination of attribute values specifies the designated Web site and the at least one of the designated user device type, the designated ad delivery mode, or the designated ad behavior, and the second combination of attribute values specifies a second Web site that includes the designated Web site and the at least one of the designated user device type, the designated ad delivery mode, or the designated ad behavior.

At step 206, a first number of impressions in each of the first subsets that correspond to a first portion of the time periods are estimated using a first trend that is based on the first subsets that correspond to a second portion of the time periods to provide respective first forecasts. In an example implementation, trend generation module 304 generates first trend 322A based on the first subsets that correspond to the second portion of the time periods. For instance, trend generation module 304 may derive the first subsets that correspond to the second portion of the time periods from first periodic aggregated time series 320A. In accordance with this example implementation, forecast module 306 estimates the first number of the impressions in each of the first subsets that correspond to the first portion of the time periods using first trend 322A to provide respective first forecasts 324A.

A duration of the first portion of the time periods plus a duration of the second portion of the time periods may be any suitable period of time. For instance, the period of time may be approximately R weeks, months, years, etc., where R is a positive number. For instance, the period of time may be 39 weeks, 8.3 months, one year, four years, three-quarters of a decade, etc.

In an example embodiment, the duration of the second portion of the time periods is greater than the duration of the first portion of the time periods. For instance, a ratio of the duration of the second portion of the time periods to the duration of the first portion of the time periods may be greater than or equal to approximately two, three, four, etc. For example, the duration of the second portion of the time periods may be approximately nine months, and the duration of the first portion of the time periods may be approximately three months, such that the ratio of the duration of the second portion of the time periods to the duration of the first portion of the time periods is equal to approximately three. In another example, the duration of the second portion of the time periods may be approximately eleven months, and the duration of the first portion of the time periods may be approximately one month, such that the ratio of the duration of the second portion of the time periods to the duration of the first portion of the time periods is equal to approximately eleven. In yet another example, the duration of the second portion of the time periods may be approximately ten years, and the duration of the first portion of the time periods may be approximately one year, such that the ratio of the duration of the second portion of the time periods to the duration of the first portion of the time periods is equal to approximately ten. The example durations of the first and second time periods mentioned above are provided for illustrative purposes and are not intended to be limiting. The first and second portions of the time periods may be any suitable respective durations.

At step 208, a second number of impressions in each of the second subsets that correspond to the first portion of the time periods are estimated using a second trend that is based on the second subsets that correspond to the second portion of the time periods to provide respective second forecasts. In an example implementation, trend generation module 304 generates second trend 322B based on the second subsets that correspond to the second portion of the time periods. For instance, trend generation module 304 may derive the second subsets that correspond to the second portion of the time periods from second periodic aggregated time series 320B. In accordance with this example implementation, forecast module 306 estimates the second number of the impressions in each of the second subsets that correspond to the first portion of the time periods using second trend 322B to provide respective second forecasts 324B.

At step 210, the first numbers and the first forecasts are compared to determine a first cumulative error value. In an example implementation, comparison module 308 compares the first numbers and first forecasts 324A to determine first cumulative error value 326A. For instance, comparison module 308 may derive the first numbers from first periodic aggregated time series 320A.

At step 212, the second numbers and the second forecasts are compared to determine a second cumulative error value. In an example implementation, comparison module 308 compares the second numbers and second forecasts 324B to determine second cumulative error value 326B. For instance, comparison module 308 may derive the second numbers from second periodic aggregated time series 320B. Upon completion of step 212, flow continues to step 214, which is shown in FIG. 2B.

At step 214, Z impressions are selected from a specified time period. Z is a positive integer. The specified time period may be any suitable time period, including but not limited to approximately one week, approximately two weeks, approximately three weeks, approximately one month, etc. In an example implementation, impression determination module 310 selects the Z impressions from the specified time period. Impression determination module 310 provides a threshold indicator 328 to counter module 312, specifying that Z impressions are selected.

At step 216, a variable N is set to equal one. In an example implementation, counter module 312 sets the variable N to equal one.

At step 218, a determination is made whether an Nth impression of the Z impressions is included among the first subsets. In an example implementation, subset determination module 314 determines whether the Nth impression is included among the first subsets. For instance, subset determination module 314 may determine a value of N based on a counter indicator 330, which is received from counter module 308 and which specifies the value of N. Subset determination module 314 provides an indicator that specifies whether the Nth impression is included among the first subsets. For instance, the indicator may have a first value if the Nth impression is included among the first subsets or a second value if the Nth impression is not included among the first subsets. Subset determination module 314 includes the indicator in subset indicators 332, which are provided to linking module 318. If the Nth impression is included among the first subsets, flow continues to step 220. Otherwise, flow continues to step 222.

At step 220, a determination is made whether the Nth impression is included among the second subsets. In an example implementation, subset determination module 314 determines whether the Nth impression is included among the second subsets. Subset determination module 314 provides an indicator that specifies whether the Nth impression is included among the second subsets. For instance, the indicator may have a first value if the Nth impression is included among the second subsets or a second value if the Nth impression is not included among the second subsets. Subset determination module 314 includes the indicator in subset indicators 332. If the Nth impression is included among the second subsets, flow continues to step 224. Otherwise, flow continues to step 226.

At step 222, a determination is made whether the Nth impression is included among the second subsets. In an example implementation, subset determination module 314 determines whether the Nth impression is included among the second subsets. Subset determination module 314 provides an indicator that specifies whether the Nth impression is included among the second subsets. For instance, the indicator may have a first value if the Nth impression is included among the second subsets or a second value if the Nth impression is not included among the second subsets. Subset determination module 314 includes the indicator in subset indicators 332. If the Nth impression is included among the second subsets, flow continues to step 228. Otherwise, flow continues to step 230.

At step 224, a determination is made whether the first cumulative error value is less than the second cumulative error value. In an example implementation, error module 316 determines whether first cumulative error value 326A is less than second cumulative error value 326B. Error module 316 provides an error indicator 334 to linking module. Error indicator 334 specifies whether first cumulative error value 326A is less than second cumulative error value 326B. For instance, error indicator 334 may have a first value if first cumulative error value 326A is less than second cumulative error value 326B or a second value if first cumulative error value 326A is not less than second cumulative error value 326B. If the first cumulative error value is less than the second cumulative error value, flow continues to step 226. Otherwise, flow continues to step 228.

At step 226, the Nth impression is linked to a third trend. The third trend is based on the first subsets that correspond to the first portion of the time periods and the first subsets that correspond to the second portion of the time periods. In an example implementation, linking module 318 links the Nth impression to the third trend. For instance, linking module 318 may determine the value of N based on counter indicator 330. Linking module 318 may link the Nth impression to the third trend based on subset indicators 332 and/or error indicator 334. For example, linking module 318 may link the Nth impression to the third trend if subset indicators 332 specify that the Nth impression is included among the first subsets but not among the second subsets. In another example, linking module 318 may link the Nth impression to the third trend if subset indicators 332 specify that the Nth impression is included among the first and second subsets and error indicator 334 specifies that the first cumulative error value is less than the second cumulative error value. Upon completion of step 226, flow continues to step 230.

At step 228, the Nth impression is linked to a fourth trend. The fourth trend is based on the second subsets that correspond to the first portion of the time periods and the second subsets that correspond to the second portion of the time periods. In an example implementation, linking module 318 links the Nth impression to the fourth trend. Linking module 318 may link the Nth impression to the fourth trend based on subset indicators 332 and/or error indicator 334. For example, linking module 318 may link the Nth impression to the fourth trend if subset indicators 332 specify that the Nth impression is included among the second subsets but not among the first subsets. In another example, linking module 318 may link the Nth impression to the fourth trend if subset indicators 332 specify that the Nth impression is included among the first and second subsets and error indicator 334 specifies that the first cumulative error value is not less than the second cumulative error value. Upon completion of step 228, flow continues to step 230.

At step 230, a determination is made whether the variable N equals Z. In an example implementation, counter module 312 determines whether N equals Z. If N equals Z, flowchart 200 ends. Otherwise, flow continues to step 232.

At step 232, the variable N is incremented by one. In an example implementation, counter module 312 increments N by one. Upon completion of step 232, flow returns to step 218.

In some example embodiments, one or more steps 202, 204, 206, 208, 210, 212, 214, 216, 218, 220, 222, 224, 226, 228, 230, and/or 232 of flowchart 200 may not be performed. Moreover, steps in addition to or in lieu of steps 202, 204, 206, 208, 210, 212, 214, 216, 218, 220, 222, 224, 226, 228, 230, and/or 232 may be performed.

It will be recognized that backend module 300 may not include one or more of aggregation module 302, trend generation module 304, forecast module 306, comparison module 308, impression determination module 310, counter module 312, subset determination module 314, error module 316, and/or linking module 318. Furthermore, backend module 300 may include modules in addition to or in lieu of aggregation module 302, trend generation module 304, forecast module 306, comparison module 308, impression determination module 310, counter module 312, subset determination module 314, error module 316, and/or linking module 318.

B. Example Frontend Processing Embodiments

Figure 4:
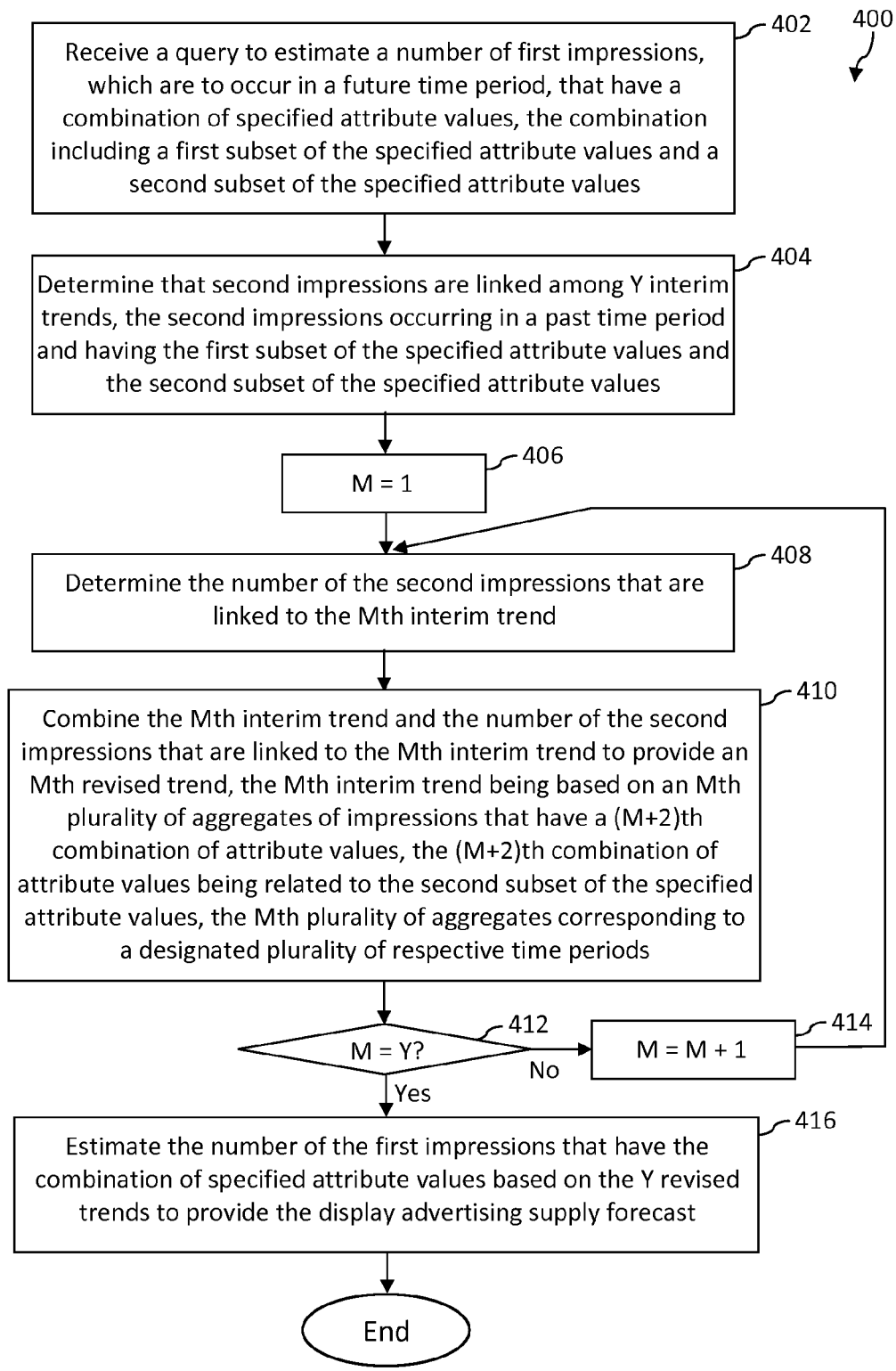
FIG. 4 depicts a flowchart of an example method for providing a display advertising supply forecast in accordance with an embodiment described herein.
Figure 5:
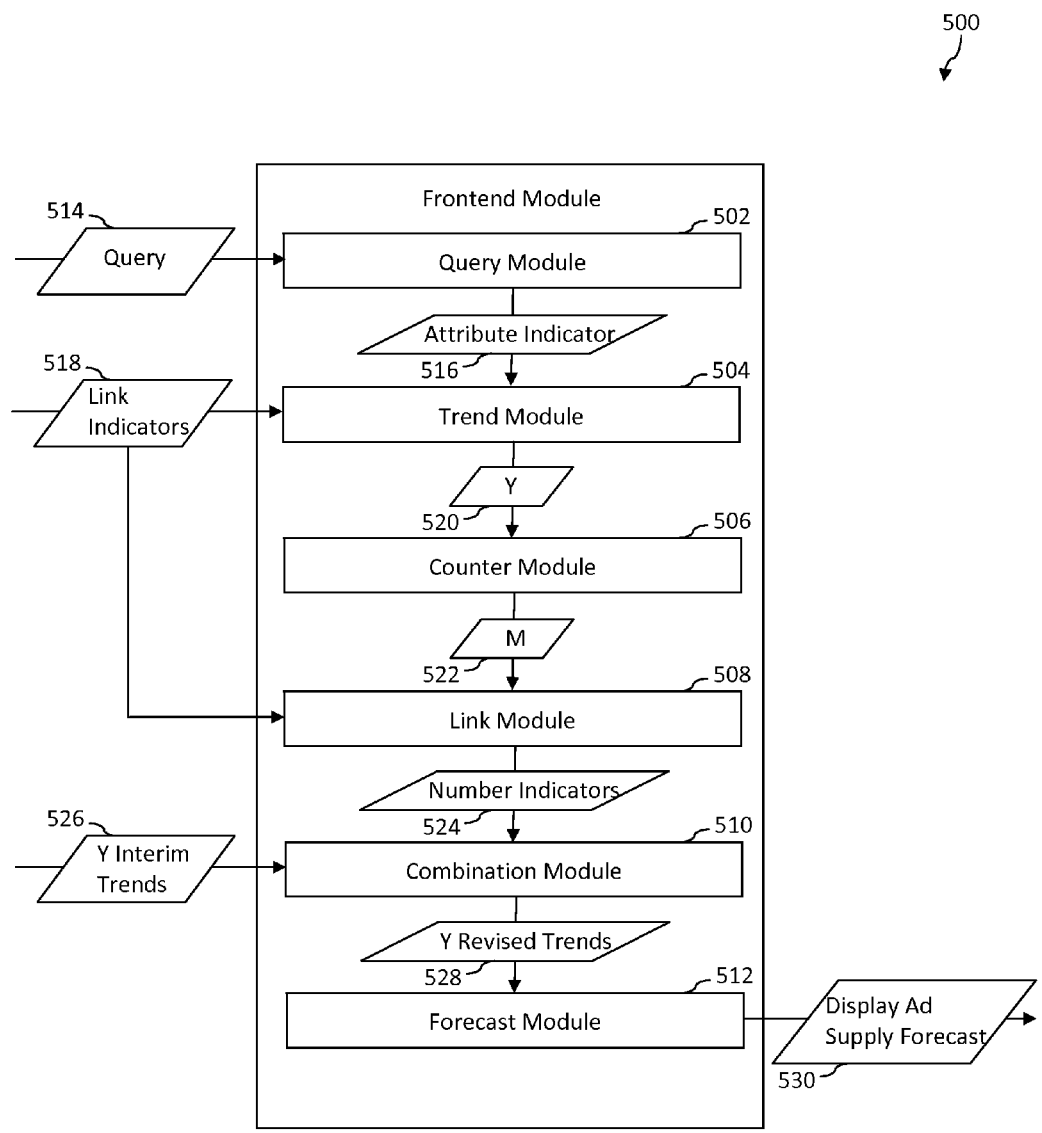
FIG. 5 is a block diagram of an example implementation of a frontend module shown in FIG. 1 in accordance with an embodiment described herein.

FIG. 4 depicts a flowchart 400 of an example method for providing a display advertising supply forecast in accordance with an embodiment described herein. Flowchart 400 may be performed by frontend module 114 of display ad network 100 shown in FIG. 1, for example. For illustrative purposes, flowchart 400 is described with respect to a frontend module 500 shown in FIG. 5, which is an example of a frontend module 114, according to an embodiment. As shown in FIG. 5, frontend module 500 includes a query module 502, a trend module 504, a counter module 506, a link module 508, a combination module 510, and a forecast module 512. Further structural and operational embodiments will be apparent to persons skilled in the relevant art(s) based on the discussion regarding flowchart 400. Flowchart 400 is described as follows.

As shown in FIG. 4, the method of flowchart 400 begins at step 402. In step 402, a query to estimate a number of first impressions, which are to occur in a future time period, that have a combination of specified attribute values is received. The combination includes a first subset of the specified attribute values and a second subset of the specified attribute values. In an example implementation, query module 502 receives query 514. For instance, query module 502 may interpret query 514 to determine the specified attribute values. Query module 502 provides attribute indicator 516 to trend module 504. Attribute indicator 516 specifies the attribute values that are specified in query 514.

At step 404, a determination is made that second impressions are linked among Y interim trends. The second impressions occur in a past time period and have the first subset of the specified attribute values and the second subset of the specified attribute values. The past time period may be any suitable time period, including but not limited to approximately one week, approximately two weeks, approximately three weeks, approximately one month, etc. Y is a positive integer. In an example implementation, trend module 504 determines that the second impressions are linked among the Y interim trends. For example, trend module 504 may determine that the second impressions are linked among the Y interim trends based on link indicators 518 and attribute indicator 516. In accordance with this example, trend module 504 may determine which impressions in the past time period have the first subset of the specified attribute values and the second subset of the specified attribute values based on attribute indicator 516 to determine the second impressions. Link indicators 518 specify links between impressions that occur in the past time period and interim trends. Trend module 504 reviews link indicators 518 that are associated with the second impressions to determine that the second impressions are linked among the Y interim trends. Trend module 504 provides a threshold indicator 520 to counter module 506, specifying that the second impressions are linked among the Y interim trends.

At step 406, a variable M is set to equal one. In an example implementation, counter module 506 sets M equal to one.

At step 408, the number of the second impressions that are linked to the Mth interim trend is determined. For instance, the number of the second impressions that are linked to the Mth interim trend may be determined based on a random sample of a plurality of impression that includes the second impressions, though the scope of the example embodiments is not limited in this respect. In an example implementation, link module 508 determines the number of the second impressions that are linked to the Mth interim trend. For instance, subset link module 508 may determine a value of M based on a counter indicator 522, which is received from counter module 506 and which specifies the value of M. Link module 508 provides an indicator that specifies the number of the second impressions that are linked to the Mth interim trend. Link module 508 includes the indicator in number indicators 524, which are provided to combination module 510.

At step 410, the Mth interim trend and the number of the second impressions that are linked to the Mth interim trend are combined to provide an Mth revised trend. The Mth interim trend is based on an Mth plurality of aggregates of impressions that have a (M+2)th combination of attribute values. The (M+2)th combination of attribute values is related to the second subset of the specified attribute values. The Mth plurality of aggregates corresponds to a designated plurality of respective time periods. In an example implementation, combination module 510 combines the Mth interim trend and the number of the second impressions that are linked to the Mth interim trend to provide the Mth revised trend. For instance, the Mth interim trend may be include in the Y interim trends 526, which are received by combination module 510. Combination module 510 may determine the number of the second impressions that are linked to the Mth interim trend based on number indicators 524. Combination module 510 may include the Mth revised trend in Y revised trends 528, which are provided by combination module 510 to forecast module 512.

In an example embodiment, the number of the second impressions that are linked to the Mth interim trend is specified as a proportion of the second impressions that are linked to the Mth interim trend. In accordance with this example embodiment, the Mth interim trend and the proportion of the second impressions that are linked to the Mth interim trend are combined to provide the Mth revised trend.

In another example embodiment, the Mth interim trend is a periodically normalized interim trend. A periodically normalized interim trend is a trend for which each aggregate of impressions is normalized independently of the other aggregates. For instance, a first aggregate may be normalized with respect to a first reference value; a second aggregate may be normalized with respect to a second reference value; and so on. In accordance with this example embodiment, the Mth periodically normalized interim trend is based on an Mth plurality of normalized aggregates of impressions that have the (M+2)th combination of attribute values. The Mth plurality of normalized aggregates corresponds to the designated plurality of respective time periods. In further accordance with this example embodiment, the Mth periodically normalized interim trend and the number of the second impressions that are linked to the Mth periodically normalized interim trend are combined to provide the Mth revised trend.

For example, the past time period may be the last week, and the designated plurality of time periods may represent the days of the past week. In accordance with this example, the Mth interim trend may be capable of forecasting daily aggregates of impressions for future weeks. In Table 1 below, let A represent the daily aggregates of impressions for the past week; let B represent daily aggregates of impressions for a first future week (i.e., first daily forecasts); and let C represent daily aggregates of impressions for a second future week (i.e., second daily forecasts).

TABLE 1

Example daily aggregates for weeks A, B, and C

|   | Sunday | Monday | Tuesday | Wednesday | Thursday | Friday | Saturday |
|---|---|---|---|---|---|---|---|
| A | 10 | 12 | 15 | 15 | 14 | 12 | 12 |
| B | 11 | 12 | 15 | 15 | 15 | 12 | 10 |
| C | 12 | 13 | 16 | 16 | 16 | 13 | 11 |

The interim trend may be periodically normalized with respect to the last week of history by dividing the forecast for each day in the first and second daily forecasts by the respective daily aggregate of the last week. For instance, the forecasts for the future Sundays may be divided by the last week's aggregate for Sunday; the forecasts for the future Mondays may be divided by the last week's aggregate for Monday; and so on to provide first normalized daily forecasts B' and second normalized daily forecasts C', as shown in Table 2 below.

TABLE 2

Example normalized daily forecasts for weeks B and C

|   | Sunday | Monday | Tuesday | Wednesday | Thursday | Friday | Saturday |
|---|---|---|---|---|---|---|---|
| A | 10 | 12 | 15 | 15 | 14 | 12 | 12 |
| B' | 1.10 | 1.00 | 1.00 | 1.00 | 1.07 | 1.00 | 0.83 |
| C' | 1.20 | 1.08 | 1.07 | 1.07 | 1.14 | 1.08 | 0.92 |

It should be noted that by using a periodically normalized interim trend as the Mth interim trend, a proportion of the second impressions that are linked to the Mth interim trend need not necessarily be computed on the fly. For instance, the trend is already divided by the last week's aggregates during backend processing, so that the number of the second impressions that are linked to the Mth interim trend (in absolute terms) and the Mth periodically normalized interim trend may be combined in real-time. Accordingly, using a periodically normalized interim trend as the Mth interim trend may conserve frontend processing time.

At step 412, a determination is made whether the variable M equals Y. In an example implementation, counter module 506 determines whether M equals Y. If M equals Y, flow continues to step 416. Otherwise, flow continues to step 414.

At step 414, the variable M is incremented by one. In an example implementation, counter module 506 increments M by one. Upon completion of step 414, flow returns to step 408.

At step 416, the number of the first impressions that have the combination of specified attribute values is estimated based on the Y revised trends to provide the display advertising supply forecast. In an example implementation, forecast module 512 estimates the number of the first impressions that have the combination of specified attribute values based on Y revised trends 528 to provide display ad supply forecast 530.

In an example embodiment, forecast module 512 estimates the number of the first impressions that have the combination of specified attribute values for each of the Y trends to provide Y respective intermediate forecasts. In accordance with this example embodiment, forecast module 512 combines the Y intermediate forecasts to provide the display advertising supply forecast.

In some example embodiments, one or more steps 402, 404, 406, 408, 410, 412, 414, and/or 416 of flowchart 400 may not be performed. Moreover, steps in addition to or in lieu of steps 402, 404, 406, 408, 410, 412, 414, and/or 416 may be performed.

It will be recognized that frontend module 500 may not include one or more of query module 502, trend module 504, counter module 506, link module 508, combination module 510, and/or forecast module 512. Furthermore, frontend module 500 may include modules in addition to or in lieu of query module 502, trend module 504, counter module 506, link module 508, combination module 510, and/or forecast module 512.

C. Other Example Embodiments

Although the steps of flowchart 200 as depicted in FIG. 2 and the elements of backend module 300 as depicted in FIG. 3 are described with respect to the backend processing embodiments of section II.A., it will be recognized that any one or more of steps 202, 204, 206, 208, 210, 212, 214, 216, 218, 220, 222, 224, 226, 228, 230, and/or 232 of flowchart 200 may be performed with respect to a frontend (i.e., real-time) process. Moreover, any one or more of aggregation module 302, trend generation module 304, forecast module 306, comparison module 308, impression determination module 310, counter module 312, subset determination module 314, error module 316, and/or linking module 318 may be implemented in a frontend module (e.g., frontend module 114).

Although the steps of flowchart 400 as depicted in FIG. 4 and the elements of frontend module 500 as depicted in FIG. 5 are described with respect to the frontend processing embodiments of section II.B., it will be recognized that any one or more of steps 402, 404, 406, 408, 410, 412, 414, and/or 416 of flowchart 400 may be performed with respect to a backend (i.e., non-real-time) process. Moreover, any one or more of query module 502, trend module 504, counter module 506, link module 508, combination module 510, and/or forecast module 512 may be implemented in a backend module (e.g., backend module 112).

Ad supply forecaster 110, backend module 112, frontend module 114, aggregation module 302, trend generation module 304, forecast module 306, comparison module 308, impression determination module 310, counter module 312, subset determination module 314, error module 316, linking module 318, query module 502, trend module 504, counter module 506, link module 508, combination module 510, and forecast module 512 may be implemented in hardware, software, firmware, or any combination thereof.

For example, ad supply forecaster 110, backend module 112, frontend module 114, aggregation module 302, trend generation module 304, forecast module 306, comparison module 308, impression determination module 310, counter module 312, subset determination module 314, error module 316, linking module 318, query module 502, trend module 504, counter module 506, link module 508, combination module 510, and/or forecast module 512 may be implemented as computer program code configured to be executed in one or more processors.

In another example, ad supply forecaster 110, backend module 112, frontend module 114, aggregation module 302, trend generation module 304, forecast module 306, comparison module 308, impression determination module 310, counter module 312, subset determination module 314, error module 316, linking module 318, query module 502, trend module 504, counter module 506, link module 508, combination module 510, and/or forecast module 512 may be implemented as hardware logic/electrical circuitry.

III. Example Computer Implementation

Figure 6:
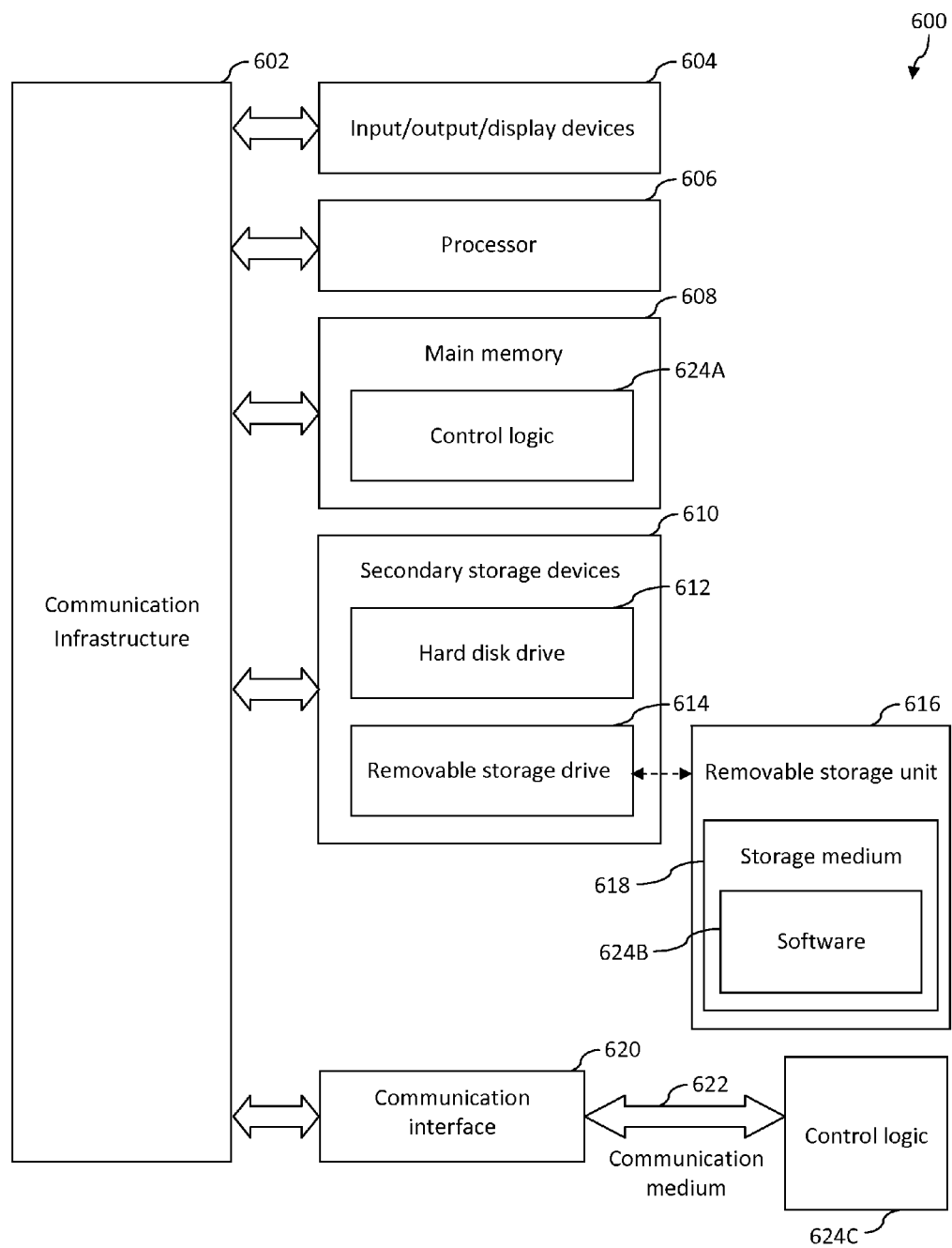
FIG. 6 is a block diagram of a computer in which embodiments may be implemented.

The embodiments described herein, including systems, methods/processes, and/or apparatuses, may be implemented using well known servers/computers, such as computer 600 shown in FIG. 6. For instance, elements of example display ad network 100, including any of the user systems 102A-102M, any of the servers 104A-104N, advertiser system 108, and ad serving system 106 depicted in FIG. 1 and elements thereof, each of the steps of flowchart 200 depicted in FIGS. 2A-2B, and each of the steps of flowchart 400 depicted in FIG. 4 can each be implemented using one or more computers 600.

Computer 600 can be any commercially available and well known computer capable of performing the functions described herein, such as computers available from International Business Machines, Apple, Sun, HP, Dell, Cray, etc. Computer 600 may be any type of computer, including a desktop computer, a server, etc.

As shown in FIG. 6, computer 600 includes one or more processors (e.g., central processing units (CPUs)), such as processor 606. Processor 606 may include ad supply forecaster 110, backend module 112, and/or frontend module 114 of FIG. 1; aggregation module 302, trend generation module 304, forecast module 306, comparison module 308, impression determination module 310, counter module 312, subset determination module 314, error module 316, and/or linking module 318 of FIG. 3; query module 502, trend module 504, counter module 506, link module 508, combination module 510, and/or forecast module 512 of FIG. 5; or any portion or combination thereof, for example, though the scope of the embodiments is not limited in this respect. Processor 606 is connected to a communication infrastructure 602, such as a communication bus. In some embodiments, processor 606 can simultaneously operate multiple computing threads.

Computer 600 also includes a primary or main memory 608, such as a random access memory (RAM). Main memory has stored therein control logic 624A (computer software), and data.

Computer 600 also includes one or more secondary storage devices 610. Secondary storage devices 610 include, for example, a hard disk drive 612 and/or a removable storage device or drive 614, as well as other types of storage devices, such as memory cards and memory sticks. For instance, computer 600 may include an industry standard interface, such as a universal serial bus (USB) interface for interfacing with devices such as a memory stick. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 618 having stored therein computer software 624B (control logic) and/or data. Removable storage unit 616 represents a floppy disk, magnetic tape, compact disc (CD), digital versatile disc (DVD), Blue-ray disc, optical storage disk, memory stick, memory card, or any other computer data storage device. Removable storage drive 614 reads from and/or writes to removable storage unit 616 in a well known manner.

Computer 600 also includes input/output/display devices 604, such as monitors, keyboards, pointing devices, etc.

Computer 600 further includes a communication or network interface 620. Communication interface 620 enables computer 600 to communicate with remote devices. For example, communication interface 620 allows computer 600 to communicate over communication networks or mediums 622 (representing a form of a computer useable or readable medium), such as local area networks (LANs), wide area networks (WANs), the Internet, etc. Network interface 620 may interface with remote sites or networks via wired or wireless connections. Examples of communication interface 622 include but are not limited to a modem, a network interface card (e.g., an Ethernet card), a communication port, a Personal Computer Memory Card International Association (PCMCIA) card, etc.

Control logic 624C may be transmitted to and from computer 600 via the communication medium 622.

Any apparatus or manufacture comprising a computer useable or readable medium having control logic (software) stored therein is referred to herein as a computer program product or program storage device. This includes, but is not limited to, computer 600, main memory 608, secondary storage devices 610, and removable storage unit 616. Such computer program products, having control logic stored therein that, when executed by one or more data processing devices, cause such data processing devices to operate as described herein, represent embodiments of the invention.

For example, each of the elements of example ad supply forecaster 110, backend module 112, and frontend module 114, each depicted in FIG. 1; aggregation module 302, trend generation module 304, forecast module 306, comparison module 308, impression determination module 310, counter module 312, subset determination module 314, error module 316, and linking module 318, each depicted in FIG. 3; query module 502, trend module 504, counter module 506, link module 508, combination module 510, and forecast module 512, each depicted in FIG. 5; each of the steps of flowchart 200 depicted in FIGS. 2A-2B; and each of the steps of flowchart 400 depicted in FIG. 4 can be implemented as control logic that may be stored on a computer useable medium or computer readable medium, which can be executed by one or more processors to operate as described herein.

IV. Conclusion

While various embodiments have been described above, it should be understood that they have been presented by way of example only, and not limitation. It will be apparent to persons skilled in the relevant arts) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of linking impressions to trends, comprising:
aggregating impressions in each of a plurality of first subsets of impressions that corresponds to a plurality of respective time periods to provide a first periodically aggregated time series, each of the impressions in the first subsets having a first combination of attribute values that is related to a designated combination of attribute values;
aggregating impressions in each of a plurality of second subsets of impressions that corresponds to the plurality of respective time periods to provide a second periodically aggregated time series, each of the impressions in the second subsets having a second combination of attribute values that is related to the designated combination of attribute values;
estimating a first number of impressions in each of the first subsets that correspond to a first portion of the time periods using a first trend that is based on the first subsets that correspond to a second portion of the time periods to provide respective first forecasts;
estimating a second number of impressions in each of the second subsets that correspond to the first portion of the time periods using a second trend that is based on the second subsets that correspond to the second portion of the time periods to provide respective second forecasts;
comparing, by a processor, the first numbers and the first forecasts to determine a first cumulative error value;
comparing, by a processor, the second numbers and the second forecasts to determine a second cumulative error value;
for each impression that occurs in a specified period of time, link the impression to a third trend that is based on the first subsets that correspond to the first portion of the time periods and the first subsets that correspond to the second portion of the time periods if the impression is included among the first subsets and among the second subsets and the first cumulative error value is less than the second cumulative error value;
for each impression that occurs in the specified period of time, link the impression to a fourth trend that is based on the second subsets that correspond to the first portion of the time periods and the second subsets that correspond to the second portion of the time periods if the impression is included among the first subsets and among the second subsets and the first cumulative error value is greater than the second cumulative error value;
for each impression that occurs in the specified period of time, link the impression to the third trend if the impression is included among the first subsets and not among the second subsets; and
for each impression that occurs in the specified period of time, link the impression to the fourth trend if the impression is included among the second subsets and not among the first subsets.

2. The method of claim 1, wherein the designated combination of attribute values specifies a designated Web site;
wherein the first combination of attribute values specifies the designated Web site; and
wherein the second combination of attribute values specifies a second Web site that includes the designated Web site.

3. The method of claim 2, wherein the designated combination of attribute values, the first combination of attribute values, and the second combination of attribute values further specify a common user device type.

4. The method of claim 2, wherein the designated combination of attribute values, the first combination of attribute values, and the second combination of attribute values further specify a common ad delivery mode.

5. The method of claim 1, wherein a duration of the first portion of the time periods plus a duration of the second portion of the time periods is greater than or equal to approximately one year.

6. The method of claim 1, wherein aggregating the impressions in each of the plurality of first subsets comprises:
aggregating the impressions in each of the plurality of first subsets to provide the first periodically aggregated time series using a client side counting log; and
wherein aggregating the impressions in each of the plurality of second subsets comprises:
aggregating the impressions in each of the plurality of second subsets to provide the second periodically aggregated time series using the client side counting log.

7. The method of claim 1, further comprising:
receiving a query to estimate a number of third impressions, which are to occur in a future time period, that have the designated combination of attribute values and a third combination of attribute values;
combining the third trend and a number of impressions that occur in the specified period of time that are linked to the third trend and that have the designated combination of attribute values and the third combination of attribute values to provide a revised third trend;
combining the fourth trend and a number of the impressions that occur in the specified period of time that are linked to the fourth trend and that have the designated combination of attribute values and the third combination of attribute values to provide a revised fourth trend; and
estimating the number of the third impressions that have the designated combination of attribute values and the third combination of attribute values based on the revised third trend and the revised fourth trend to provide a display advertising supply forecast.

8. The method of claim 7, wherein estimating the number of the third impressions that have the designated combination of attribute values and the third combination of attribute values comprises:
estimating the number of the third impressions that have the designated combination of attribute values and the third combination of attribute values based on the revised third trend to provide a first intermediate forecast;
estimating the number of the third impressions that have the designated combination of attribute values and the third combination of attribute values based on the revised fourth trend to provide a second intermediate forecast; and
combining the first intermediate forecast and the second intermediate forecast to provide the display advertising supply forecast.

9. The method of claim 7, further comprising:
determining the number of the impressions that occur in the specified period of time that are linked to the third trend and that have the designated combination of attribute values and the third combination of attribute values based on a random sample of the impressions that occur in the specified period of time; and
determining the number of the impressions that occur in the specified period of time that are linked to the fourth trend and that have the designated combination of attribute values and the third combination of attribute values based on a random sample of the impressions that occur in the specified period of time.

10. The method of claim 7, wherein a duration of the specified period of time is approximately one week.

11. A system to link impressions to trends, comprising:
an aggregation module comprising electrical circuitry, the aggregation module being configured to aggregate impressions in each of a plurality of first subsets of impressions that corresponds to a plurality of respective time periods to provide a first periodically aggregated time series, each of the impressions in the first subsets having a first combination of attribute values that is related to a designated combination of attribute values, the aggregation module further configured to aggregate impressions in each of a plurality of second subsets of impressions that corresponds to the plurality of respective time periods to provide a second periodically aggregated time series, each of the impressions in the second subsets having a second combination of attribute values that is related to the designated combination of attribute values;
a forecast module configured to estimate a first number of impressions in each of the first subsets that correspond to a first portion of the time periods using a first trend that is based on the first subsets that correspond to a second portion of the time periods to provide respective first forecasts, the forecast module further configured to estimate a second number of impressions in each of the second subsets that correspond to the first portion of the time periods using a second trend that is based on the second subsets that correspond to the second portion of the time periods to provide respective second forecasts;
a comparison module configured to compare the first numbers and the first forecasts to determine a first cumulative error value, the comparison module further configured to compare the second numbers and the second forecasts to determine a second cumulative error value; and
a linking module configured to link each impression that occurs in a specified period of time and that is included among the first subsets and among the second subsets to a third trend that is based on the first subsets that correspond to the first portion of the time periods and the first subsets that correspond to the second portion of the time periods if the first cumulative error value is less than the second cumulative error value, the linking module further configured to link each impression that occurs in the specified period of time and that is included among the first subsets and among the second subsets to a fourth trend that is based on the second subsets that correspond to the first portion of the time periods and the second subsets that correspond to the second portion of the time periods if the first cumulative error value is greater than the second cumulative error value, the linking module further configured to link each impression that occurs in the specified period of time and that is included among the first subsets and not among the second subsets to the third trend, the linking module further configured to link each impression that occurs in the specified period of time and that is included among the second subsets and not among the first subsets to the fourth trend.

12. The system of claim 11, further comprising:
a query module configured to receive a query to estimate a number of third impressions, which are to occur in a future time period, that have the designated combination of attribute values and a third combination of attribute values;

a combination module configured to combine the third trend and a number of impressions that occur in the specified period of time that are linked to the third trend and that have the designated combination of attribute values and the third combination of attribute values to provide a revised third trend, the combination module further configured to combine the fourth trend and a number of the impressions that occur in the specified period of time that are linked to the fourth trend and that have the designated combination of attribute values and the third combination of attribute values to provide a revised fourth trend; and a second forecast module configured to estimate the number of the third impressions that have the designated combination of attribute values and the third combination of attribute values based on the revised third trend and the revised fourth trend to provide a display advertising supply forecast.

13. The system of claim 11, further comprising:

a link module configured to determine the number of the impressions that occur in the specified period of time that are linked to the third trend and that have the designated combination of attribute values and the third combination of attribute values based on a random sample of the impressions that occur in the specified period of time, the link module further configured to determine the number of the impressions that occur in the specified period of time that are linked to the fourth trend and that have the designated combination of attribute values and the third combination of attribute values based on a random sample of the impressions that occur in the specified period of time.

14. The system of claim 11, wherein the designated combination of attribute values specifies a designated Web site;

wherein the first combination of attribute values specifies the designated Web site; and wherein the second combination of attribute values specifies a second Web site that includes the designated Web site.

15. The system of claim 14, wherein the designated combination of attribute values, the first combination of attribute values, and the second combination of attribute values further specify a common user device type.

16. The system of claim 14, wherein the designated combination of attribute values, the first combination of attribute values, and the second combination of attribute values further specify a common ad delivery mode.

17. The system of claim 11, wherein a duration of the first portion of the time periods plus a duration of the second portion of the time periods is greater than or equal to approximately one year.

18. The system of claim 11, wherein the aggregation module is configured to aggregate the impressions in each of the plurality of first subsets to provide the first periodically aggregated time series using a client side counting log; and wherein the aggregation module is configured to aggregate the impressions in each of the plurality of second subsets to provide the second periodically aggregated time series using the client side counting log.

19. The system of claim 12, wherein the second forecast module is configured to estimate the number of the third impressions that have the designated combination of attribute values and the third combination of attribute values based on the revised third trend to provide a first intermediate forecast;

wherein the second forecast module is configured to estimate the number of the third impressions that have the designated combination of attribute values and the third combination of attribute values based on the revised fourth trend to provide a second intermediate forecast; and wherein the second forecast module is configured to combine the first intermediate forecast and the second intermediate forecast to provide the display advertising supply forecast.

20. A computer program product comprising a computer-readable storage medium having computer program logic recorded thereon for enabling a processor-based system to link impressions to trends, the computer program product comprising:

a first program logic module for enabling the processor-based system to aggregate impressions in each of a plurality of first subsets of impressions that corresponds to a plurality of respective time periods to provide a first periodically aggregated time series, the first program logic module further for enabling the processor-based system to aggregate impressions in each of a plurality of second subsets of impressions that corresponds to the plurality of respective time periods to provide a second periodically aggregated time series, each of the impressions in the first subsets having a first combination of attribute values that is related to a designated combination of attribute values, each of the impressions in the second subsets having a second combination of attribute values that is related to the designated combination of attribute values;

a second program logic module for enabling the processor-based system to estimate a first number of impressions in each of the first subsets that correspond to a first portion of the time periods using a first trend that is based on the first subsets that correspond to a second portion of the time periods to provide respective first forecasts, the second program logic module further for enabling the processor-based system to estimate a second number of impressions in each of the second subsets that correspond to the first portion of the time periods using a second trend that is based on the second subsets that correspond to the second portion of the time periods to provide respective second forecasts;

a third program logic module for enabling the processor-based system to compare the first numbers and the first forecasts to determine a first cumulative error value, the third program logic module further for enabling the processor-based system to compare the second numbers and the second forecasts to determine a second cumulative error value; and a fourth program logic module for enabling the processor-based system to, for each impression that occurs in a specified period of time, link the impression to a third trend that is based on the first subsets that correspond to the first portion of the time periods and the first subsets that correspond to the second portion of the time periods if the impression is included among the first subsets and among the second subsets and the first cumulative error value is less than the second cumulative error value, the fourth program logic module further for enabling the processor-based system to, for each impression that occurs in the specified period of time, link the impression to a fourth trend that is based on the second subsets that correspond to the first portion of the time periods and the second subsets that correspond to the second portion of the time periods if the impression is included among the first subsets and among the second subsets and the first cumulative error value is greater than the second cumulative error value, the fourth program logic module further for enabling the processor-based system to, for each impression that occurs in the specified period of time, link the impression to the third trend if the impression is included among the first subsets and not among the second subsets, the fourth program logic module further for enabling the processor-based system to, for each impression that occurs in the specified period of time, link the impression to the fourth trend if the impression is included among the second subsets and not among the first subsets.

* * * * *